(12) United States Patent
Lin

(10) Patent No.: US 10,767,680 B2
(45) Date of Patent: Sep. 8, 2020

(54) SELF-DRILLING SCREW

(71) Applicant: Fushang Co., Ltd., Kaohsiung (TW)

(72) Inventor: Jung-Nan Lin, Kaohsiung (TW)

(73) Assignee: Fushang Co., Ltd., Kaohsiung (TW)

( * ) Notice: Subject to any disclaimer, the term of this patent is extended or adjusted under 35 U.S.C. 154(b) by 299 days.

(21) Appl. No.: 15/871,203

(22) Filed: Jan. 15, 2018

(65) Prior Publication Data
US 2019/0219091 A1 Jul. 18, 2019

(51) Int. Cl.
*F16B 25/00* (2006.01)
*F16B 25/10* (2006.01)
*F16B 33/02* (2006.01)

(52) U.S. Cl.
CPC ........ *F16B 25/103* (2013.01); *F16B 25/0031* (2013.01); *F16B 25/0052* (2013.01); *F16B 25/0057* (2013.01); *F16B 25/0073* (2013.01); *F16B 25/0084* (2013.01); *F16B 2033/025* (2013.01)

(58) Field of Classification Search
CPC .......................... F16B 25/0052; F16B 25/0057
USPC ........................ 411/387.4, 386, 311, 418, 420
See application file for complete search history.

(56) References Cited

U.S. PATENT DOCUMENTS

| | | | | |
|---|---|---|---|---|
| 4,653,244 A | * | 3/1987 | Farrell | E04F 13/0837 411/399 |
| 5,110,245 A | * | 5/1992 | Hiroyuki | F16B 25/0015 411/417 |
| 6,450,748 B1 | * | 9/2002 | Hsu | F16B 25/0015 411/387.4 |
| 6,696,987 B1 | | 2/2004 | Dicke | |
| 7,237,994 B2 | | 7/2007 | Hepworth | |
| 7,862,280 B2 | * | 1/2011 | Su | F16B 25/0015 411/387.8 |
| 8,985,926 B2 | * | 3/2015 | Hamano | F16B 25/0047 411/420 |
| 9,322,422 B2 | * | 4/2016 | Park | F16B 25/0015 |
| 9,523,383 B2 | * | 12/2016 | Park | F16B 25/0057 |

(Continued)

FOREIGN PATENT DOCUMENTS

| | | |
|---|---|---|
| DE | 9417920 U1 | 2/1995 |
| JP | H11166519 A | 6/1999 |

(Continued)

*Primary Examiner* — Flemming Saether
(74) *Attorney, Agent, or Firm* — Alan D. Kamrath; Karin L. Williams; Mayer & Williams PC

(57) ABSTRACT

A self-drilling screw includes a shank and at least one thread. The shank includes a self-drilling portion, a head portion spaced from the self-drilling portion along a longitudinal axis, and a straight rod portion between the self-drilling portion and the head portion. The thread is spirally formed on the straight rod portion and includes a plurality of thread convolutions. Each thread convolution is provided with three to eight recesses spaced apart circumferentially, and a screw thread portion is formed between two adjacent recesses. The recess features a recess length circumferentially, and the screw thread portion features a screw thread length circumferentially. The screw thread length is 25% to 200% of the recess length. The self-drilling screw can be driven into articles to be fastened quickly without loss of binding forces between the self-drilling screw and the articles.

8 Claims, 12 Drawing Sheets

(56) References Cited

U.S. PATENT DOCUMENTS

2013/0336744 A1\* 12/2013 Phua ................... F16B 25/0026
411/387.1
2017/0016467 A1  1/2017 Wang

FOREIGN PATENT DOCUMENTS

TW    M383651 U    7/2010
TW    M507469 U    8/2015

\* cited by examiner

SELF-DRILLING SCREW

BACKGROUND OF THE INVENTION

1. Field of the Invention

The present invention relates to a screw and, more particularly, to a self-drilling screw with which a composite board and a metal sheet can be securely fastened.

2. Description of the Related Art

Self-drilling screws have been used in fastening metal sheets widely. FIG. 1 illustrates a conventional self-drilling screw 10 including a shank 12 and a thread 14 formed on the shank 12. The shank 12 is formed with a self-drilling portion 16 at one end thereof and a head portion 18 at the other end thereof. The self-drilling portion 16 includes a tip 20 and two cutting edge portions 22 extending toward the head portion 18 from the tip 20. The shank 12 is provided with a plurality of filing grooves 24 and a V-shaped groove 26 therein. A metal sheet in which the self-drilling screw 10 is being driven is drilled and cut with the cutting edge portions 22 followed by the thread 14 on the shank 12 such that the shank 12 is screwed in the metal sheet. The filing grooves 24 are paths through which filings cut from the metal sheet are discharged. The V-shaped groove 26 contributes to development of sharp cutting edges 28 at thread crests of the thread 14 for better cutting capacity of the thread 14. However, the self-drilling screw 10 in FIG. 1 is applicable to drilling and fastening metal sheets only rather than being driven into a composite board (for example, a plank made of wood, hard southern pine, or plastic resin and compressed wood-chip mixture) because of higher frictional resistances attributed to oversized contact areas between the thread 14 and the composite board in which the thread 14 is screwed. Furthermore, the composite board squeezed by the thread 14 which is being driven into the composite board arduously may fracture. Moreover, the thread 14 of the self-drilling screw 10 works on a regular screw-in process but is short of the effect to prevent drawing stress and reversed screw-out.

FIG. 2 illustrates another conventional self-drilling screw 30 which is used to fasten a composite board (for example, plywood or a plank made of hard southern pine) at the top layer and a metal sheet at the bottom layer. The self-drilling screw 30 includes a shank 32 and a thread 34 on the shank 32. The shank 32 is formed with a self-drilling portion 36 at one end and a head portion 38 at the other end. The self-drilling portion 36 includes a tip 40 and two cutting edge portions 42 extending toward the head portion 38 from the tip 40. The self-drilling portion 36 is formed with two fins 44 at the upper end thereof. When a composite board and a metal sheet are ready to be fastened by the self-drilling screw 30, a hole is opened in the composite board at the top layer, which is drilled by the self-drilling portion 36, and expanded by the fins 44 such that the thread 34 at the rear segment of the self-drilling screw 30 can be easily driven into the composite board. When the cutting edge portions 42 of the self-drilling portion 36 are driven into the metal sheet, the fins 44 rubbing against the metal sheet will fall off. Then, the metal sheet in which the thread 34 is screwed and the composite board are securely fastened. Because the hole in the composite board at the top layer is expanded by the fins 44 in the beginning, the self-drilling screw 30 can be smoothly driven into the composite board and fixed in the metal sheet at the bottom layer. However, when the fins 44 rub against the metal sheet, a stronger screwing torque must be applied on the self-drilling screw 30 by an operator arduously before separation of the fins 44 from the self-drilling portion 36. Other undesirable situations probably occur where the thread 34 cannot be screwed in the metal sheet when the fins 14 are not detached from the self-drilling portion 36, or the metal sheet in which an oversized hole is drilled by the fins 44 cannot be securely fastened by the thread 34 of the self-drilling screw 30.

BRIEF SUMMARY OF THE INVENTION

Thus, an objective of the present invention is to provide a self-drilling screw which is applicable to fastening a composite board at the top layer and a metal sheet at the bottom layer and can be driven into the composite board smoothly without support of any fin on a self-drilling portion of the self-drilling screw for a higher screw-in speed, easy operation and reliable binding forces between the self-drilling screw and articles to be fastened.

To achieve this and other objectives, a self-drilling screw of the present invention includes a shank and a first thread. The shank includes a self-drilling portion, a head portion spaced from the self-drilling portion along a longitudinal axis, and a straight rod portion between the self-drilling portion and the head portion. The first thread is spirally formed on the straight rod portion and includes a plurality of thread convolutions. Each thread convolution has a lower cutting face facing the self-drilling portion, an upper cutting face backing onto the self-drilling portion, and a cutting line interconnecting the lower and upper cutting faces. Each of at least partial thread convolutions is provided with three to eight recess portions spaced in a circumferential direction of the straight portion, and a screw thread portion is defined between two adjacent recess portions in the circumferential direction. Each recess portion is recessed inward from the cutting line in a radial direction of the straight rod portion and has a recess length in the circumferential direction of the straight portion. Each screw thread portion has a screw thread length in the circumferential direction of the straight portion. The screw thread length is preferably 25% to 200% of the recess length.

In an embodiment, the screw thread length is 50% to 150% of the recess length. The recess portion features a maximum recess depth in the radial direction, and the recess depth is 10% to 60% of a thread height of the thread convolution. The recess portion includes two side edges thereof, and each of the two side edges connects with an adjacent screw thread portion to form an arcuate corner therebetween.

In an embodiment, the self-drilling screw further includes a second thread having an outer diameter greater than an outer diameter of the first thread. The straight rod portion includes a lower segment adjacent to the self-drilling portion and an upper segment adjacent to the head portion. The first thread is spirally developed on the lower segment of the straight rod portion, and the second thread is spirally developed on the upper segment of the straight rod portion and spirals along an upward direction in contrast to an upward direction of the first thread.

In an embodiment, each thread convolution of the first thread is provided with three to eight recess portions which are spaced an equal angle apart in the circumference direction of the straight rod portion, and the recess portions in the thread convolutions of the first thread are arranged offset with respect to the longitudinal axis. In an embodiment, each thread convolution of the first thread is formed with five recess portions and five screw thread portions, and the screw thread length is 50% to 150% of the recess length.

In an embodiment, each thread convolution of the first thread is formed with three recess portions and three screw thread portion, and the screw thread length is 50% to 150% of the recess length.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 4a is an enlarged view of a circled portion of FIG. 4.

FIG. 4b is a sectional view taken along line 4b-4b of FIG. 4a.

DETAILED DESCRIPTION OF THE INVENTION

Figure 1:
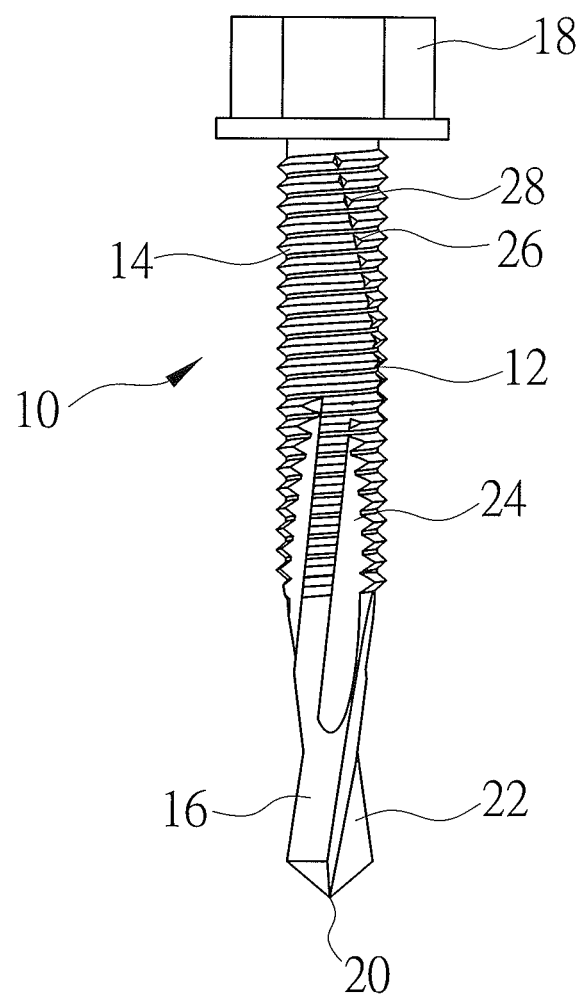
FIG. 1 is a schematic view of a conventional self-drilling screw.
Figure 2:
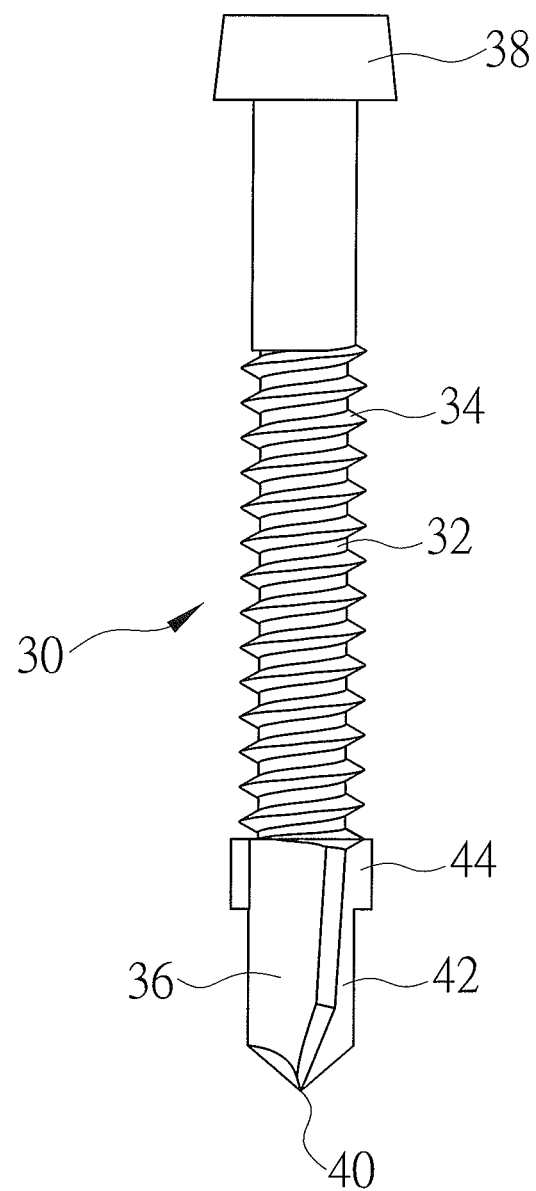
FIG. 2 is a schematic view of another conventional self-drilling screw.
Figure 3:
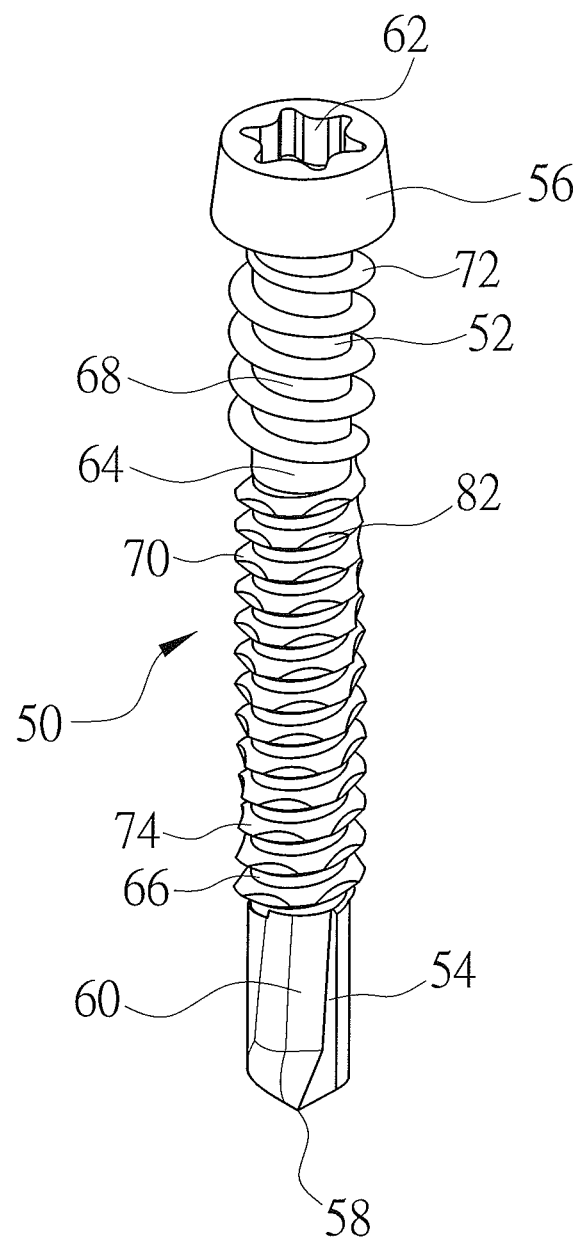
FIG. 3 is a perspective view of a self-drilling screw according to a first embodiment of the present invention.

A self-drilling screw according to a first embodiment of the present invention is shown in FIGS. 3 through 6 of the drawings and generally designated 50. The self-drilling screw 50 is particularly applicable to fastening a composite board at the top layer and a metal sheet at the bottom layer. The self-drilling screw 50 includes a shank 52 with a self-drilling portion 54 and a head portion 56 spaced from the self-drilling portion 54 along a longitudinal axis (X). The self-drilling portion 54 has a tip 58 and two cutting edge portions 60 extending toward the head portion 56 from the tip 58. The head portion 56 has a socket 62 formed in a top surface thereof for accommodating a screwdriver's head (not shown in figures). The shank 52 further includes a straight rod portion 64 located between the self-drilling portion 54 and the head portion 60. The straight rod portion 64 includes a lower segment 66 adjacent to the self-drilling portion 54 and an upper segment 68 adjacent to the head portion 56. In this embodiment, the straight rod portion 64 features a circular cross section. In a feasible embodiment, the straight rod portion 64 features a noncircular cross section.

Figure 4:
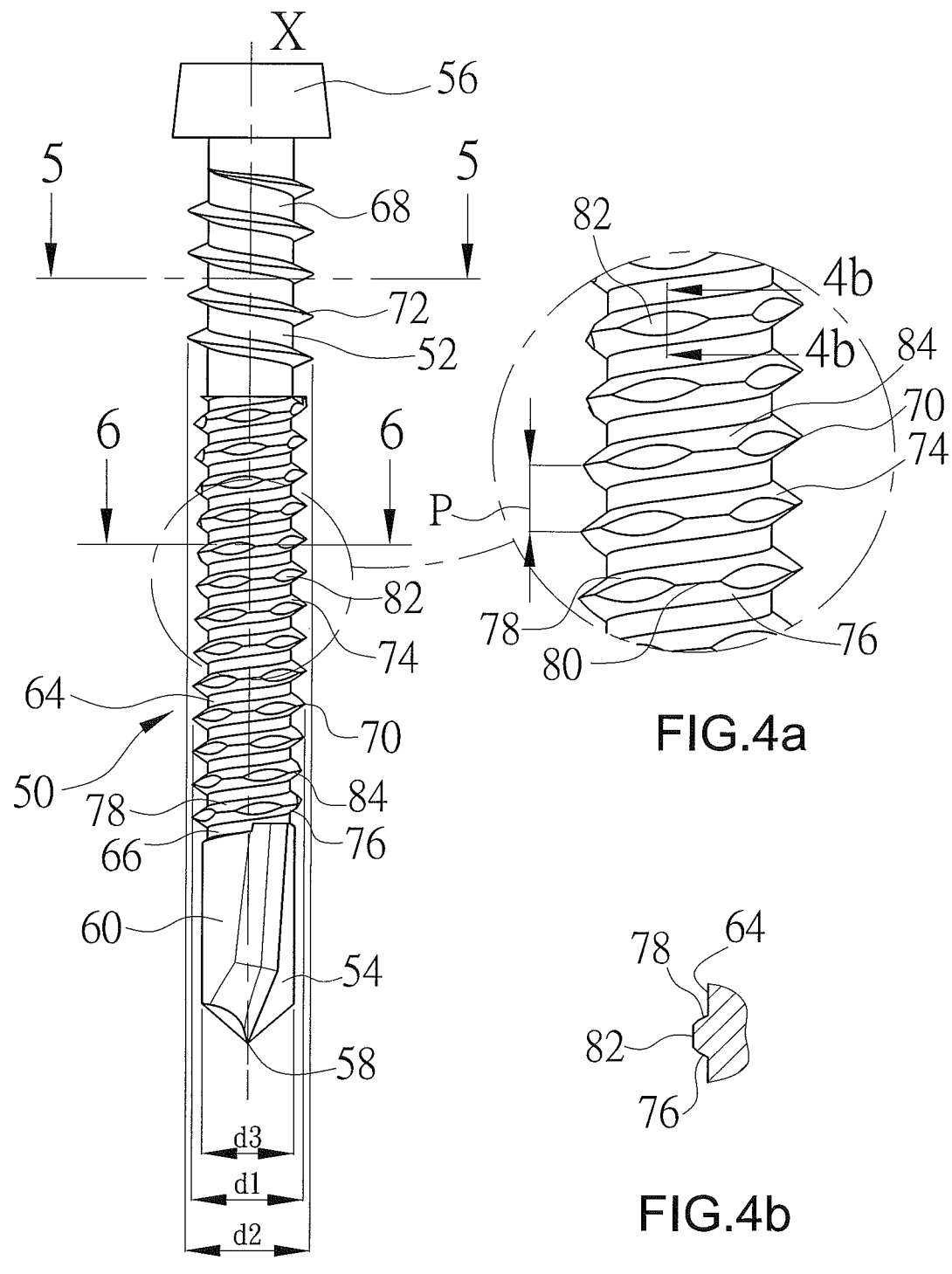
FIG. 4 is a front view of the self-drilling screw of FIG. 3.
Figure 5:
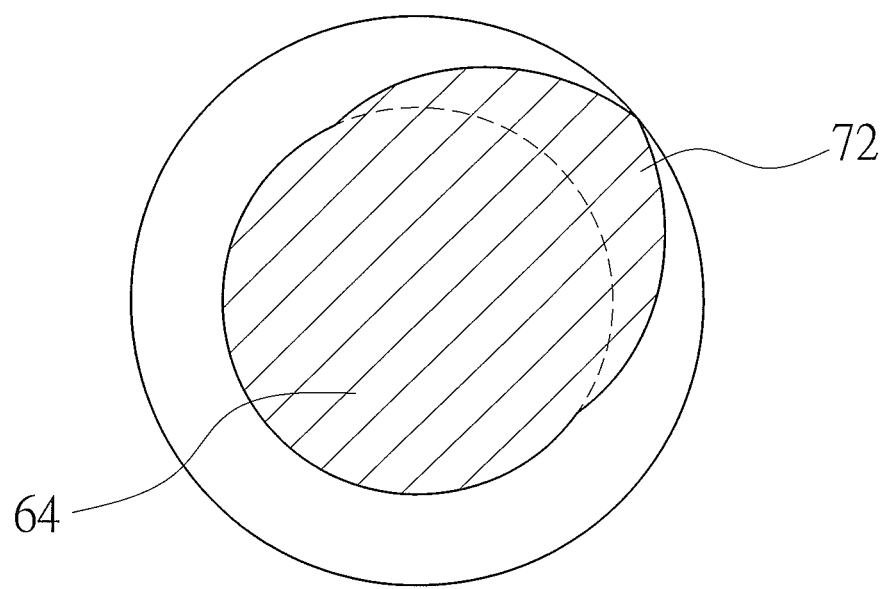
FIG. 5 is a sectional view taken along line 5-5 of FIG. 4.
Figure 6:
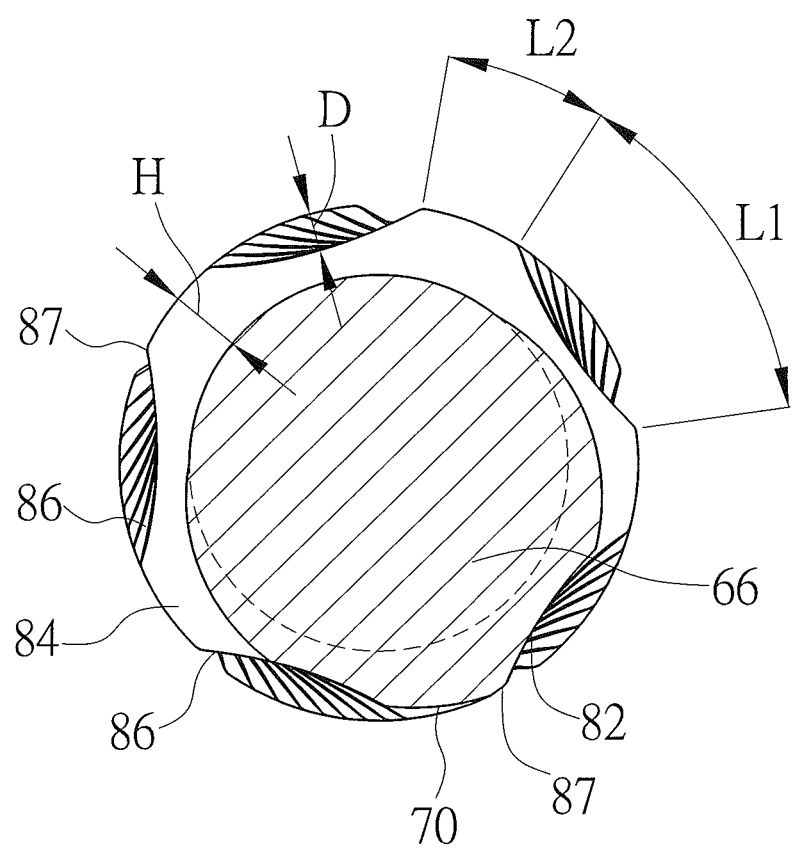
FIG. 6 is a sectional view taken along line 6-6 of FIG. 4.

The self-drilling screw 50 further includes a continuous first thread 70 and a continuous second thread 72. The first thread 70 is spirally developed on the lower segment 66 of the straight rod portion 64 and includes a plurality of thread convolutions 74. Two adjacent thread convolutions 74 constitute a pitch (P) in between. Each thread convolution 74 has a lower cutting face 76 at the screw-in side (facing the self-drilling portion 54), an upper cutting face 78 at the screw-out side (backing onto the self-drilling portion 54), and a cutting line 80 interconnecting the lower and upper cutting faces 76 and 78. The second thread 72 is spirally developed on the upper segment 68 of the straight rod portion 64, and an upward spiral direction of the second thread 72 is opposite to that of the first thread 70. As shown in FIG. 4, the second thread 72 is wound and extended clockwise toward the upper left, while the first thread 70 is wound and extended anticlockwise toward the upper right. The second thread 72 features a pitch greater than the pitch (P) of the first thread 70. As shown in FIG. 4, the first thread 70 features an outer diameter (d1) less than an outer diameter (d2) of the second thread 72 but greater than an outer diameter (d3) of the self-drilling portion 54. Each of at least some of the thread convolutions 74 of the first thread 70 is provided with three to eight recess portions 82 spaced around the straight rod portion 64 circumferentially, and a screw thread portion 84 with the cutting line 80 is between two adjacent recess portions 82 formed in the thread convolution 74. In this embodiment, there are five recess portions 82 and five screw thread portions 84 are defined in each thread convolution 74 of the first thread 70 (FIG. 6), and the recess portions 82 are spaced an equal angle apart in a circumferential direction of the straight portion 64. Each recess portion 82 in each thread convolution 74 is recessed inward from the cutting line 80 in a radial direction of the straight rod portion 64 (FIGS. 4a and 4b). The recess portion 82 features a maximum recess depth (D) in the radial direction centrally and has two curved side edges 86 thereof (FIG. 6). Each of the side edges 86 connects with an adjacent screw thread portion 84 to form an arcuate corner 87 therebetween. In this embodiment, the recess depth (D) is less than half of the thread height (H) of the thread convolution 74. In a preferred embodiment, the recess depth (D) is 10% to 60% of the thread height (H) of the thread convolution 74. More preferably, the recess depth (D) is 20% to 50% of the thread height (H) of the thread convolution 74, so that the rotary-cutting strength of each thread convolution 74 which contributes to discharging chippings from articles to be cut and fastened through the recess portions 82 is appropriate. Further, the shallow and wide recess portions 82 allow chippings cut from articles to be moved upward and discharged as quickly as possible. Each recess portion 82 and each screw thread portion 84 of each thread convolution 74 feature a recess length (L1) and a screw thread length (L2) in the circumferential direction of the straight portion 64, respectively. The screw thread length (L2) is preferably 25% to 200% of the recess length (L1). More preferably, the screw thread length (L2) is 50% to 150% of the recess length (L1). Even more preferably, the screw thread length (L2) is 60% to 120% of the recess length (L1). Accordingly, contact areas between the first thread 70 and articles to be fastened is reduced effectively such that the self-drilling screw 50 can be smoothly driven into and securely combined with the articles. Referring to FIG. 4, the recess portions 82 and the screw thread portions 84 in the thread convolutions 74 of the first thread 70 are arranged offset with respect to the longitudinal axis (X), respectively.

The staggered screw thread portions 84 contribute to binding forces between the first thread 70 and articles in which the first thread 70 is screwed.

Figure 7:
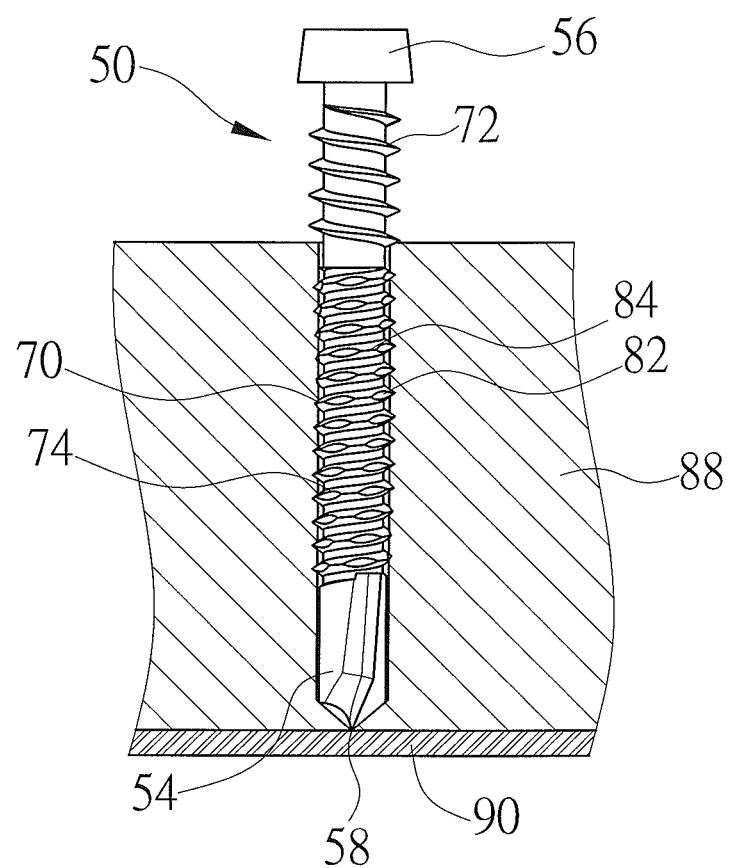
FIG. 7 is a schematic view which illustrates the self-drilling screw in FIG. 3 driven into a composite board.
Figure 8:
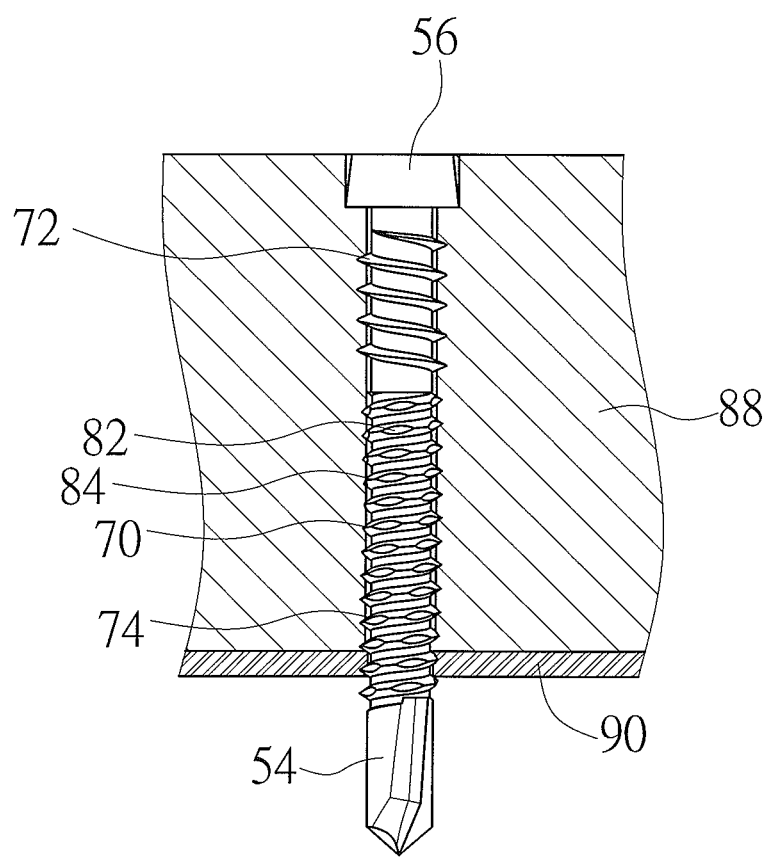
FIG. 8 is a schematic view which illustrates the self-drilling screw in FIG. 7 being further driven into a metal sheet for combination of the composite board and the metal sheet.

FIGS. 7 and 8 illustrate both a composite board 88 and a metal sheet 90 are fastened by the self-drilling screw 50. First of all, the self-drilling screw 50 is rotated by a manual or electric tool whose head is accommodated in the socket 62 in the head portion 56 such that the self-drilling portion 54 is driven into the composite board 88 at the top layer. Then, the first thread 70 is screwed in the composite board 88. When a hole is expanded by the first thread 70 that is being driven into the composite board 88 with the screw thread portions 84 contacting the composite board 88, frictional resistances applied on the thread convolutions 74 are moderated due to the design of recess portions 82 and screw thread portions 84 proportionally. Thus, frictions induced by the self-drilling portion 54 that is being driven into the metal sheet 90 continuously are reduced effectively, so that the screw-in speed of the self-drilling screw 50 is accelerated. Meanwhile, with the recess length (L1) and shape design of the recess portion 82, chippings from the cut composite board 88 is discharged from spaces of the recess portions 82 for fewer frictions, preventing the self-drilling screw 50 and the composite board 88 from breakage or fracture. Additionally, when the upper segment 68 of the straight rod portion 64 is driven into the composite board 88 for hole expansion by the second thread 72, the lower segment 66 of the straight rod portion 64 is screwed in the metal sheet 90 smoothly and both the upper segment 68 of the straight rod portion 64 and the head portion 56 are embedded into the composite board 88 closely and completely for secure combination of the composite board 88 and the metal sheet 90. Further, the effect of preventing drawing stress and reversed screw-out is obtained because of the second thread 72 and the first thread 70 on the shank 52 spiraling reversely.

For the self-drilling screw 50 of the present invention, the design feature of the first thread 70 does not lie in the cutting capacity (the self-drilling portion 54 has enough cutting capacity) to screw into the composite board 88 and the metal sheet 90 but rather to prevent excessive frictional resistances generated when the first thread 70 is screw into the articles for a higher screw-in speed and to moderate frictional resistances between the self-drilling screw 50 and the metal sheet 90 for the metal sheet 90 (for example, iron sheet, aluminum sheet, etc.) effectively drilled by the self-drilling portion 54. If the screw thread length (L2) is greater than 200% of the recess length (L1) or if the number of the recess portions 82 in each thread convolution 74 is less than three, the self-drilling screw 50 cannot be smoothly driven into articles to be fastened due to oversized contact areas between the first thread 70 and the articles. On the other hand, if the screw thread length (L2) is less than 25% of the recess length (L1) or if the number of the recess portions 82 in each thread convolution 74 is more than eight, the self-drilling screw 50 cannot be securely combined with articles to be fastened due to undersized contact areas between the first thread 70 and the articles. In a preferred embodiment, there are four to six recess portions 82 designed in each thread convolution 74.

Figure 9:
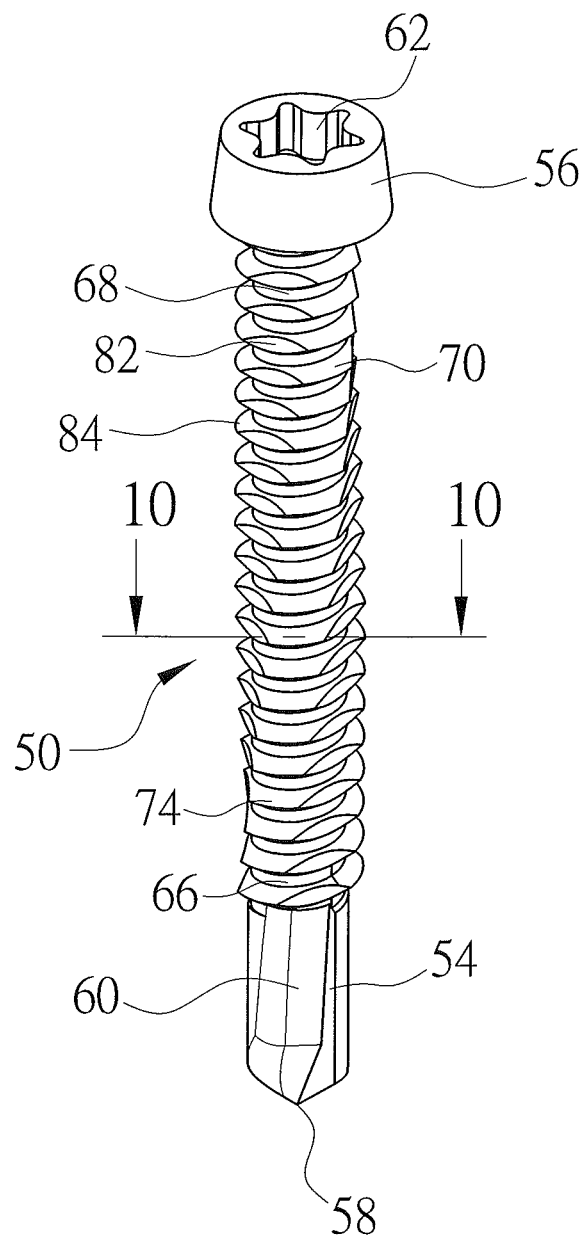
FIG. 9 is a perspective view of a self-drilling screw according to a second embodiment of the present invention.
Figure 10:
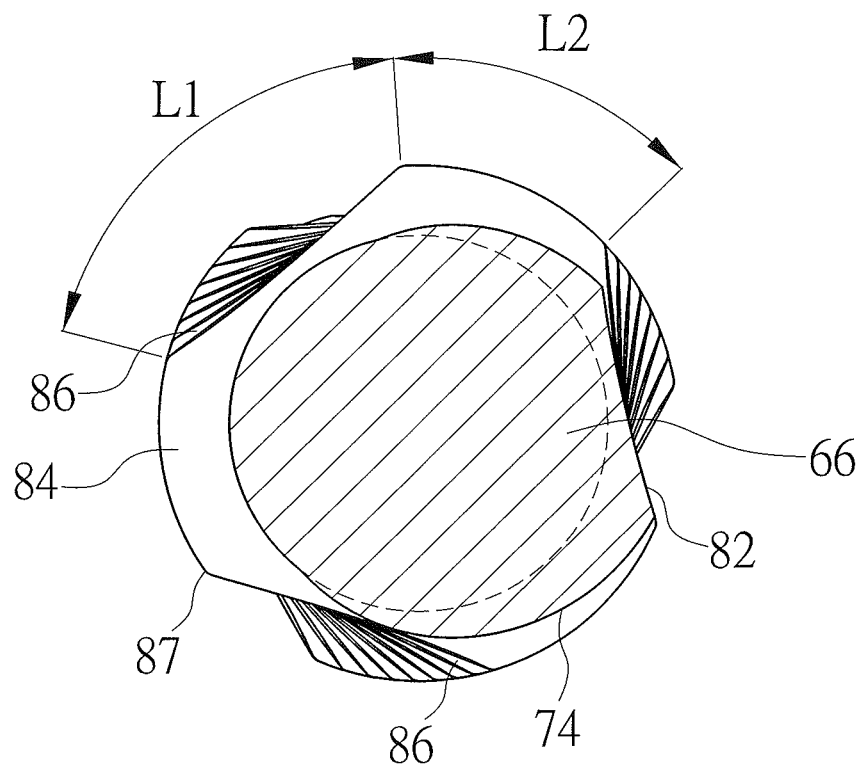
FIG. 10 is a sectional view taken along line 10-10 of FIG. 9.

FIGS. 9 and 10 illustrate the self-drilling screw 50 in a second embodiment of the present invention. In this embodiment, only the first thread 70 is provided on the shank 52 and spirally developed on both the lower segment 66 and the upper segment 68 of the straight rod portion 64. The self-drilling screw 50 in the second embodiment is applicable to a thinner composite board 88 compared with the self-drilling screw 50 in the first embodiment for a thicker or harder composite board 88. Furthermore, there are three recess portions 82 and three screw thread portions 84 designed at each thread convolution 74 and spaced an equal angle apart in the circumferential direction of the straight portion 64, with the recess length (L1) being slightly greater than the screw thread length (L2).

Figure 11:
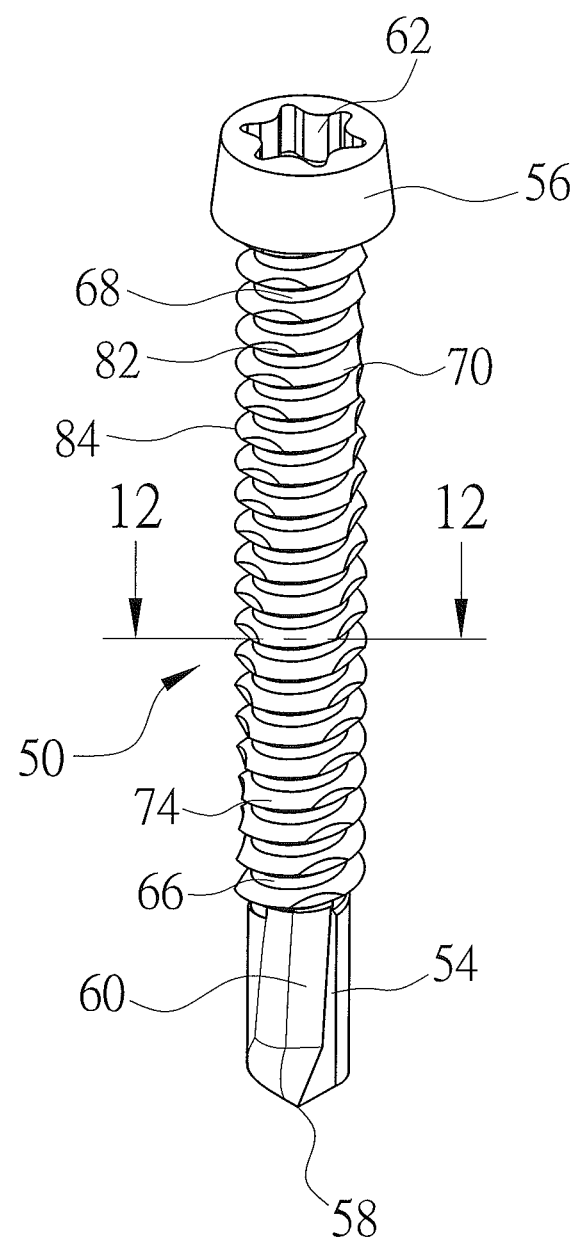
FIG. 11 is a perspective view of a self-drilling screw according to a third embodiment of the present invention.
Figure 12:
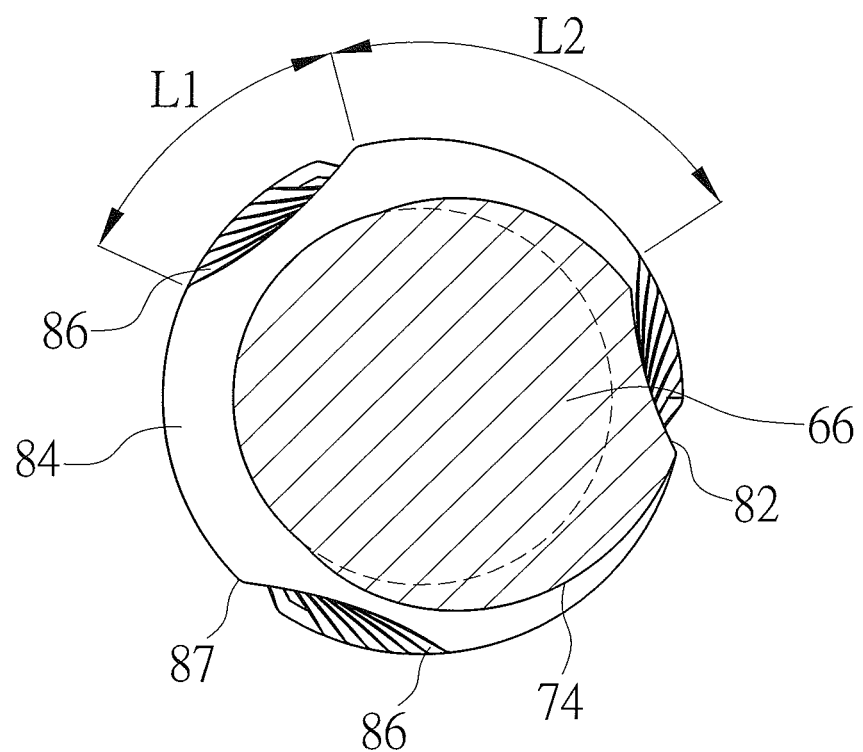
FIG. 12 is a sectional view taken along line 12-12 of FIG. 11.

FIGS. 11 and 12 illustrate the self-drilling screw 50 in a third embodiment of the present invention. In this embodiment, the first thread 70 spirals on the shank 52 only. There are three recess portions 82 and three screw thread portions 84 designed at each thread convolution 74 and spaced an equal angle apart in the circumference direction of the straight rod portion 64. The recess length (L1) is slightly less than the screw thread length (L2) but greater than half of the screw thread length (L2).

The scope of the invention is to be indicated by the appended claims, rather than by the foregoing description, and all changes which come within the meaning and range of equivalency of the claims are intended to be embraced therein.

The invention claimed is:

1. A self-drilling screw comprising:
   a shank including a self-drilling portion, a head portion spaced from the self-drilling portion along a longitudinal axis, and a straight rod portion between the self-drilling portion and the head portion, with the self-drilling portion having a tip and two cutting edge portions extending toward the head portion from the tip, with the straight rod portion including a lower segment adjacent to the self-drilling portion and an upper segment adjacent to the head portion;
   a first thread spirally formed on the lower segment of the straight rod portion and including a plurality of thread convolutions, with each thread convolution having a lower cutting face facing the self-drilling portion, an upper cutting face facing the head portion, and a cutting line interconnecting the lower and upper cutting faces, with each of the plurality of thread convolutions provided with three to eight recess portions spaced in a circumferential direction of the straight portion, with each recess portion recessed inward from the cutting line in a radial direction of the straight rod portion and having a recess length in the circumferential direction of the straight portion, with a screw thread portion defined between two adjacent recess portions in the circumferential direction and having a screw thread length in the circumferential direction of the straight portion, with the screw thread length being 25% to 200% of the recess length, wherein the recess portions in the plurality of thread convolutions are arranged circumferentially offset with respect to the longitudinal axis forming a helical pattern in a same direction as the first thread; and
   a second thread spirally developed on the upper segment of the straight rod portion and having an outer diameter greater than an outer diameter of the first thread, with an upward spiral direction of the second thread being opposite to an upward spiral direction of the first thread,
   wherein the plurality of thread convolutions include a bottommost thread convolution directly adjacent the self-drilling portion, a topmost thread convolution adjacent the upper segment of the straight rod portion, and several middle thread convolutions between the bottommost and topmost thread convolutions,
   wherein when the self-drilling portion is driven into an article, chippings cut by the self-drilling portion are moved upward to the upper segment of the straight rod portion from the recess portions in the bottommost thread convolution through the recess portions in the middle thread convolutions and the recess portions in the topmost thread convolution.

2. The self-drilling screw according to claim 1, wherein the screw thread length is 50% to 150% of the recess length.

3. The self-drilling screw according to claim 1, wherein the recess portion features a maximum recess depth in the radial direction, with the recess depth being 10% to 60% of a thread height of the thread convolution.

4. The self-drilling screw according to claim 3, wherein the recess depth is 20% to 50% of the thread height of the thread convolution.

5. The self-drilling screw according to claim 3, wherein the recess portion includes two side edges thereof, with each of the two side edges connecting with an adjacent screw thread portion to form an arcuate corner therebetween.

6. The self-drilling screw according to claim 1, wherein each thread convolution of the first thread is formed with five recess portions and five screw thread portions, with the screw thread length being 50% to 150% of the recess length.

7. The self-drilling screw according to claim 6, wherein the screw thread length is 60% to 100% of the recess length.

8. The self-drilling screw according to claim 1, wherein each thread convolution of the first thread is formed with three recess portions and three screw thread portion, with the screw thread length being 50% to 150% of the recess length.

\* \* \* \* \*